Dec. 4, 1934.   R. A. DE VORE   1,983,439
READING OUTFIT
Filed July 5, 1933   2 Sheets-Sheet 1
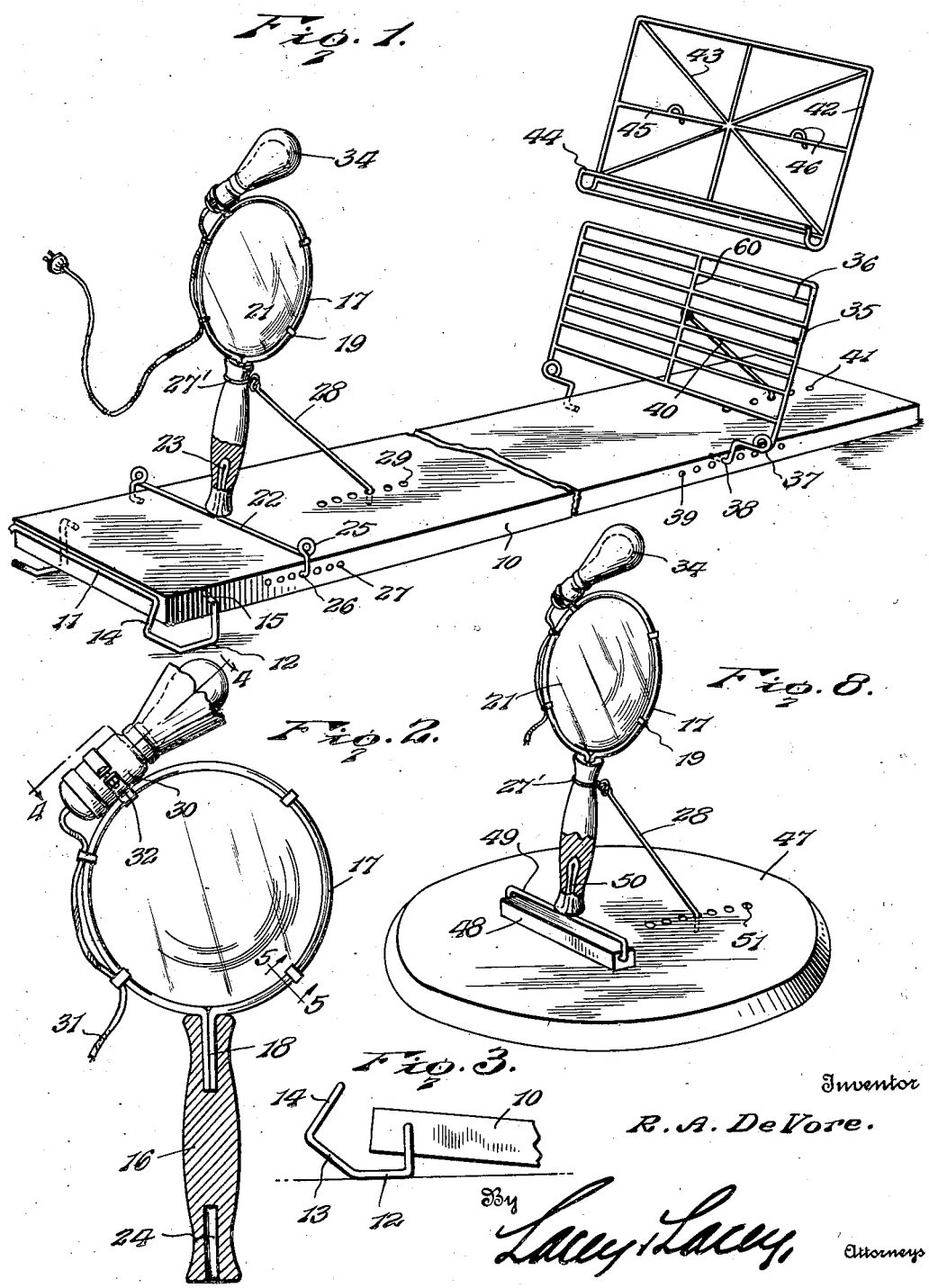
Inventor
R. A. DeVore.
By Lacey & Lacey,
Attorneys Dec. 4, 1934.   R. A. DE VORE   1,983,439
READING OUTFIT
Filed July 5, 1933   2 Sheets-Sheet 2
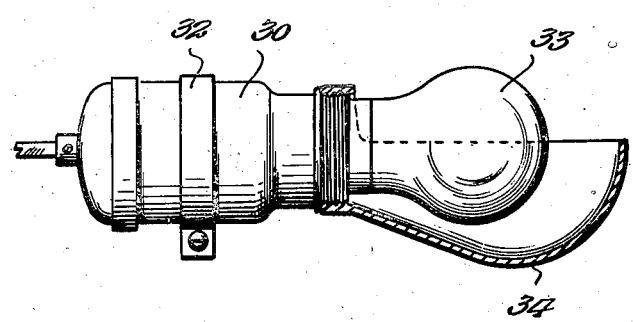
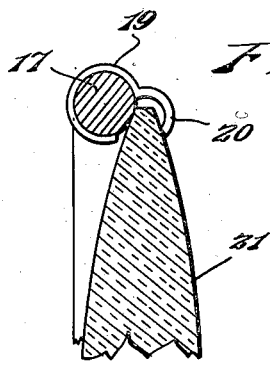
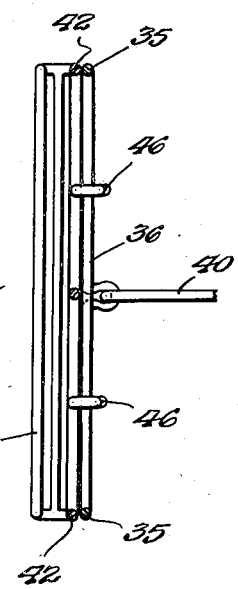
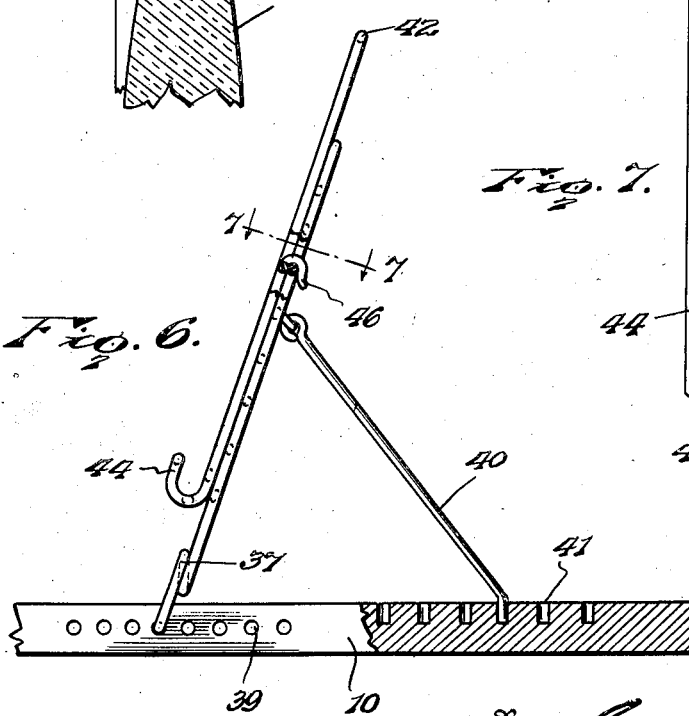

Patented Dec. 4, 1934

1,983,439

UNITED STATES PATENT OFFICE 1,983,439

READING OUTFIT

Ross A. de Vore, Atlanta, Ga.

Application July 5, 1933, Serial No. 679,141

6 Claims. (Cl. 88—39)

This invention relates to an improved reading outfit and seeks, among other objects, to provide a compact portable device of this character embodying a magnifying lens in combination with a source of illumination arranged in such a manner as to produce a high magnification of objects and to illuminate the magnified object with a powerful light, thus enabling those with poor vision to read with ease and facility.

The invention seeks, as a further object, to obtain with a given lens, a maximum increase in the visual acuity of the user and wherein the illuminating means employed will be so mounted and arranged that the annoyance of the reflection of light rays from the observed object into the eyes of the user will be minimized.

A further object of the invention is to provide a device embodying a lens of such size that binocular vision will be possible and wherein the observed object will be supported at such distance in front of the lens as will best suit accommodation to convergence of the eyes on the object.

Still another object of the invention is to provide a device wherein the inclination of the lens as well as the inclination of the observed object may be readily adjusted while also the linear distance between the two may be varied.

And the invention seeks, as a still further object, to provide a device which, in addition to its use as an aid to poor vision, will also be adapted for a wide range of commercial use, provision being made for the separate use of the reading glass of the device, and wherein the flatness of the field of vision may be improved by the use of lenses of different forms and constructions.

With the foregoing and other objects in view, the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Fig. 1 is a perspective view of my improved reading outfit,

Fig. 2 is a detail elevation of the reading glass, the handle being shown in section, Fig. 3 is a detail end elevation of the adjustable support employed at one end of the base, Fig. 4 is a section on the line 4—4 of Fig. 2, particularly showing the lamp unit, Fig. 5 is an enlarged detail section on the line 5—5 of Fig. 2, particularly showing the lens mounting, Fig. 6 is a side elevation showing the rack employed to support a book or other object to be observed through the reading lens of the reading glass, Fig. 7 is a transverse sectional view on the line 7—7 of Fig. 6, Fig. 8 is a perspective view showing a slight variation of the invention.

In carrying the invention into effect, I employ an oblong base 10 which may be of wood or other approved material and is of suitable length and width. Pivoted to the side edges of the base, near one end thereof, is a support 11 preferably formed from a length of resilient wire which is bent near its ends, as particularly seen in Fig. 3, to provide angularly disposed portions 12, 13 and 14, respectively, the wire terminating in pintles 15 which are engaged in suitable sockets in the side edges of the base 10 for swingingly connecting the support to the base. As will be perceived, when the support is swung downward to rest upon the portions 12 thereof, the adjacent end of the base will be sustained in elevated position, while, by swinging the support to rest upon the portions 13 thereof, the adjacent end of the base may be further elevated. Similarly, by swinging the support 11 to rest upon the portions 14 thereof, the adjacent end of the base will be still further elevated. The support thus provides a means for adjustably sustaining the base in inclined position.

Swingingly mounted upon the base 10, near the forward end thereof, is a reading glass which includes a substantially cylindrical handle 16, which may be of wood, and mounted upon the handle, at one end thereof, is a circular frame 17 preferably formed from a length of resilient wire bent at its ends to provide terminals 18 frictionally engaged in a suitable socket in the adjacent extremity of the handle. Embracing the frame, as shown in detail in Fig. 5, is a plurality of spring clips 19 soldered or otherwise fixed to the frame. These clips are provided with spring tongues 20, and resting at one side of its margin against the frame is a double convex lens 21 engaged at its opposite side by said tongues and securely but removably held in position on the frame thereby. The lens is preferably of a six inch diameter, so that a person may conveniently look through the lens with both eyes, and is adapted to magnify the observed object to double its normal size, it being one of the objects of the invention to double the visual acuity. Furthermore, the lens is preferably of a sixteen inch focal length, this focal length being chosen as affording binocular vision of the observed object with a minimum of accommodated convergent effort of the eyes.

Swingingly mounting the reading glass is a hinge member 22 which is preferably formed from a length of wire bent to embrace the base 10 and provided medially with a stem 23 which is frictionally but removably engaged in a socket 24 in the lower end of the handle 16. Near its ends, the length of wire is looped to provide springs 25 and is thence bent to form pintles 26 selectively engageable in longitudinally spaced openings 27 in the edges of the base 10 for swingingly connecting the hinge member with the base. Thus, the reading glass is mounted to rock in a plane at right angles to the base. Removably engaged about the handle 16, near its upper end, is a collar 27' and swingingly connected to said collar is a prop 28 selectively engageable at its lower end in a series of longitudinally spaced openings 29 in the upper face of the base. The prop is adapted to hold the reading glass in an upright position and, as will be at once appreciated, may be adjusted for varying the inclination of the reading glass with respect to the base.

Detachably connected to the frame 17 of the reading glass, preferably at a point opposite the handle 16, is a lamp unit including an appropriate socket 30 from which extends a cord 31 for connecting the socket with a suitable source of current. Embracing the frame 17 and the socket is a collar 32 detachably but firmly connecting the socket with the frame, and removably engaged in the socket is an incandescent light bulb 33, preferably of, say, sixty to seventy-five watts. Screwed upon the forward end of the socket 30 is a combined shade and reflector 34 for not only directing the light rays forwardly but also shielding the eyes of the user of the device.

Mounted upon the end portion of the base 10, opposite the reading lamp, is a rack for supporting the object to be observed. This rack includes a stand 35 the frame of which is of inverted U-shape, being preferably formed of resilient wire, and extending between the end bars of the frame are parallel cross bars 36. Near its ends, the length of wire which provides the frame is looped to form springs 37 and is thence bent to provide pintles 38, and formed in the side edges of the base 10, to selectively receive said pintles, are longitudinally spaced sockets 39. A central bar 60 connects the several cross bars 36 so as to increase the rigidity of the frame. Swingingly connected to the stand is a prop 40 and formed in the upper side of the base 10 to selectively receive the free end of said prop is a series of longitudinally spaced openings 41. The prop will thus support the stand in set position and may be adjusted for varying the inclination of the stand with respect to the base 10, so that it may assume any desired position from vertical to horizontal.

Detachably mounted upon the stand 35 is an object-holding frame 42 which is preferably rectangular and, like the stand, is also preferably formed of suitable resilient wire. Bracing the frame are diagonal struts 43 and at the lower side of the frame, the wire thereof is bent to provide a channel-shaped retaining member 44 adapted to support a book, paper or the like, resting against the frame. Extending longitudinally of the frame is a medially disposed strut 45, also preferably formed of suitable resilient wire. Between its ends and the center of this horizontal strut are hooks 46 which, as seen in Figures 6 and 7, engage over any one of the cross bars 36 so as to support the frame 42 and the book thereon at any desired height. The hooks may also be slid along the cross bar and thereby effect lateral adjustment of the frame and book or other object.

In use, the object to be observed is arranged upon the frame 42 of the stand 35, when the circuit through the filament of the bulb 33 is closed. Accordingly, the printed page, for instance, upon the frame 42 will be brilliantly illuminated while the eyes of the observer at the rear of the lens 21 will be shielded by the shade and reflector 34. Furthermore, as the bulb 33 is arranged above the lens and on the vertical diameter thereof, the angle of incidence of the light rays striking the printed page will be such that the light rays will not be reflected back into the eyes of the observer so that eye strain from such cause will be minimized. By adjusting the prop 28 in the openings 29, the angle of inclination of the reading glass may be varied to best suit the convenience of the observer, subsequent to which the angle of inclination of the stand 35 may, by adjusting the prop 30 in the series of openings 41, be varied to suit the angle of inclination of the reading glass. Furthermore, by adjusting the hinge member 22 longitudinally of the base 10 through the medium of the openings 27, or by adjusting the stand 35 longitudinally of the base 10 through the medium of the openings 39, the linear distance between the reading glass and stand may be varied to best suit the convenience of the user in observing the printed page on the frame 42 of the stand. I accordingly provide a device which will greatly facilitate the pleasure of reading and will be found especially effective and convenient for those having poor eyesight.

In the drawings, I have shown the use of a double convex lens 21. In order to obtain a flatter field of vision, for special purposes, however, there may be substituted for the circular double convex lens, one of oblong or rectangular shape, a single or double element lens, achromatic or non-achromatic, either a plano convex or double convex lens, or two plano convex lenses with their convex sides together or a combination of two plano convex cylindrical lenses with their convex sides together and their axes at right angles. The clips 19 provide a means for detachably mounting these different lenses on the frame 17.

The collar 27' and prop 28, as well as the hinge member 22 are made detachable from the handle 16 of the reading glass in order that the reading glass may be used apart from the base 10 as an ordinary hand glass, in which event the reading glass will be found highly convenient for many different purposes. Furthermore, I have provided an arrangement whereby the reading glass may be mounted upon a small circular base and used in conjunction with a lap board, for instance, or for other purposes, this variation of the invention being shown in Fig. 8 of the drawings.

Referring to Fig. 8, a circular base is indicated at 47 and mounted thereon is a block 48. Engaged in the ends of said block is a hinge member 49 similar to the hinge member 22, the member 49 being provided with a stem 50 frictionally engaged in the socket 24 in the lower end of the handle 16 of the reading glass. The collar 27' and prop 28 are used, while the base 47 is provided with a series of openings 51 to selectively receive the free end of the prop. Thus, the inclination of the reading glass with respect to the base may be readily adjusted.

Having thus described the invention, I claim:

1. A reading outfit including a base, a reading glass mounted thereon and including a lens, a rack carried by the base in spaced relation to the glass longitudinally of the base for supporting an object to be observed through the lens, and means for supporting the base at a desired incline pivoted to the base adjacent one end thereof and having portions disposed diagonally of each other and selectively movable into contact with a surface to support the base at a desired incline by turning the supporting means about its pivotal connection with the base.

2. A reading outfit including a base, a reading glass swingingly connected thereto and including a handle and a lens, a prop for holding the reading glass at a desired incline with respect to the base, said prop being loosely connected with the handle and the base being provided with a set of sockets spaced from each other longitudinally thereof whereby the free end of the prop may be engaged in a selected socket and support the glass at a desired incline and a rack carried by the base in spaced relation to the glass longitudinally of the base for supporting an object to be observed through the lens.

3. A reading outfit including a base, a reading glass carried thereby and including a lens, a rack carried by the base in spaced relation to the reading glass for supporting an object to be observed through said lens, and means for controlling inclination of said base having a portion extending transversely of the base at one end thereof and arms extending from the said portion and pivoted to the base, said arms having sections extending diagonally of each other and individually engageable with a surface to support the base at a desired incline.

4. A reading outfit including a base having sockets in opposite side edge faces thereof, a reading glass swingingly connected to the base and adjustable longitudinally thereof, said reading glass including a lens, means for adjusting the inclination of the reading glass with respect to the base, a rack for supporting an object to be observed through said lens including a stand having side bars extending downwardly and bent to form pintles engaged in selected sockets of the base and pivotally mount the rack in desired spaced relation to the reading glass, and means for adjusting the inclination of the rack with respect to the base.

5. A reading outfit including a base, a reading glass carried thereby and including a lens, a rack including a stand embracing the base and having side bars extended downwardly and bent to form pintles pivotally connected to said base and cross bars extending between the side bars, means for adjusting the inclination of the stand with respect to the base, and a rack frame adapted to support an object to be observed through said lens and having a cross bar carrying hooks engageable with a selected cross bar of the stand to adjustably support the rack from the stand.

6. A reading outfit including a base provided near its ends with spaced openings in the side edges of the base, a reading glass, a hinge member swingingly connecting the glass with the base and selectively engageable at its ends in the openings near one end of the base, means for adjusting the inclination of the reading glass with respect to the base, the reading glass including a lens, a rack including a stand swingingly connected to the base and selectively engageable at its ends in the openings near the opposite end of the base, a rack frame adjustable upon the stand and adapted to receive an object to be observed through said lens, and means for adjusting the inclination of the stand with respect to the base.

ROSS A. DE VORE. [L. S.]